R. Paton,
School Furniture,
No. 1756. Reissued Aug. 30, 1864.
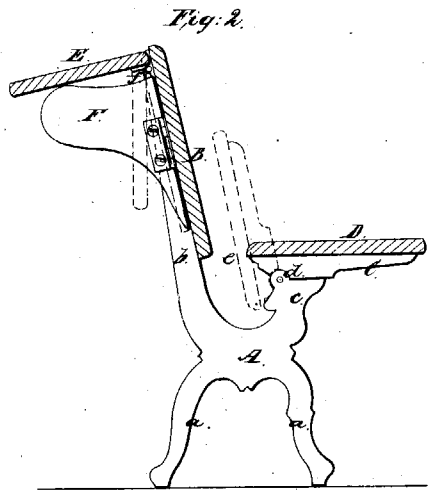
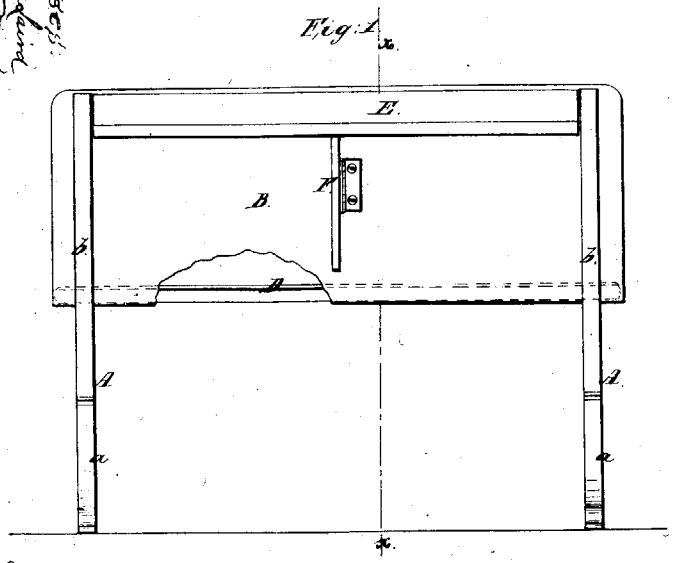
Witnesses:
James Laird
[illegible]
Inventor:
Robert Paton
N. PETERS, PHOTO-LITHOGRAPHER, WASHINGTON, D. C.

UNITED STATES PATENT OFFICE.

ROBERT PATON, OF NEW YORK, N. Y.

IMPROVED SCHOOL-SEAT.

Specification forming part of Letters Patent No. 33,101, dated August 20, 1861; Reissue No. 1,756, dated August 30, 1864.

*To all whom it may concern:*

Be it known that I, ROBERT PATON, of the city, county, and State of New York, have invented a new and Improved Seat, designed for schools and public sitting-rooms; and I do declare that the following is a full, clear, and exact description thereof, which will enable those skilled in the art to make and use the same, reference being had to the accompanying drawings, forming part of this specification, in which—

Figure 1 is a back view of my invention in elevation; Fig. 2, a transverse vertical section of the same, taken in the line *x x*, Fig. 1.

Similar letters of reference indicate corresponding parts.

This invention relates to an improvement in that class of seats which are commonly termed "folding" seats, and which are designed to offer as little obstruction as possible in the sweeping or cleansing of the room in which they are placed, as well as to facilitate the passing of persons between them in the congregating and breaking up of an audience or assemblage.

The object of the invention is to obtain the results above alluded to with a less amount of stock than hitherto required for the seats, and at the same time have equally as comfortable a one, and firmer and more durable than those hitherto constructed.

A A represent two cast-iron side pieces or supports, the lower parts of which are forked to form legs *a a*. The upper parts of the side pieces are also forked, having arms *b c*, of unequal length, as shown clearly in Fig. 2. The arms *b b* of the side pieces form supports for a back, B, which is a plank firmly bolted to the arms *b*, the plank B extending up as high or a little above the tops of the arms *b b*.

To the upper end of each arm *c* there is attached by a joint, *d*, a bar, C. The joints *d d* are at the back edges of the upper surfaces of the arms *c*, and said upper surfaces are sufficiently long to form proper bearings for the bars C when the latter are in a horizontal position.

To the bars C C the seat D is attached. This seat is simply a plank of proper thickness and of sufficient width. The back edge of the seat or plank does not extend far back of the joints *d d*, and a space, *e*, is consequently allowed between the back edge of the seat and the lower edge of the back B, as shown clearly in Fig. 2. By this arrangement it will be seen that the whole width of the seat D is rendered available as a seat, and no unnecessary stock is used, as is the case with ordinary seats of the kind, the backs of which extend underneath the lower edge of the back B and depend upon that bearing for a support, there being no bearing in front of the joints *d*, as in my invention.

In the old plan there is necessarily a considerable width of seat which is not available. The part extending over space *e* and the joints *d d* require to be made very strong, as they are subjected to the whole weight on the seat.

In my improvement, the seat being supported by the upper ends of the arms *c*, which are of sufficient area to form good bearing-surfaces nearly under the center of the bars C C, strong and efficient supports are obtained for the seat, and no unnecessary width of the seat is required. To the back B there is attached by hinges *f* a plank, E, which serves as a desk. This desk, when in use, is supported by a bracket, F, which is hinged to the back B.

The desk E is used for schools, and when not in use is readily lowered by turning bracket F to one side, as shown in red in Fig. 2. When the seat D is unoccupied, it is turned up, as also shown in red in same figure.

Thus it will be seen that the floor of the apartment in which the invention is placed may be very readily swept or cleaned, as a free passage is allowed between the rows of seats, which is all the advantage of the ordinary folding seat, while my invention, it is believed, has, in addition, the advantage of greater strength and durability, with greater economy in construction.

I will remark that it is not strictly essential that the supports *c* extend in a horizontal line outward from the joints *d*, for said supports may be in a vertical position below the joints, provided the bars C be provided with projections or so formed as to bear against the supports and retain the seat D.

I do not claim a seat arranged so as to be capable of being folded upward parallel with its back, for seats of that kind have been previously used; but I do claim as new and desire to secure by Letters Patent as an improved article of manufacture—

A folding seat, D, attached by joints *d* to the side frames, A, with stationary supports *c* on the side frames situated anywhere below or underneath the seat for the purpose of supporting the latter, substantially as set forth.

ROBERT PATON.

Witnesses:

M. M. LIVINGSTON,

C. L. TOPLIFF.